US012573899B2

(12) United States Patent
Kurasawa

(10) Patent No.: US 12,573,899 B2
(45) Date of Patent: Mar. 10, 2026

(54) ROTARY ELECTRIC MACHINE

(71) Applicant: MEIDENSHA CORPORATION, Tokyo (JP)

(72) Inventor: Takuya Kurasawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 19/100,236

(22) PCT Filed: Jul. 27, 2023

(86) PCT No.: PCT/JP2023/027614
§ 371 (c)(1),
(2) Date: Jan. 31, 2025

(87) PCT Pub. No.: WO2024/029449
PCT Pub. Date: Feb. 8, 2024

(65) Prior Publication Data
US 2025/0260279 A1 Aug. 14, 2025

(30) Foreign Application Priority Data
Aug. 2, 2022 (JP) ................................. 2022-123287

(51) Int. Cl.
*H02K 1/276* (2022.01)
*H02K 1/27* (2022.01)
(52) U.S. Cl.
CPC .................................. *H02K 1/2766* (2013.01)
(58) Field of Classification Search
CPC ...................................................... H02K 1/2766

USPC ...................................................... 310/156.49
See application file for complete search history.

(56) References Cited

U.S. PATENT DOCUMENTS

| | | | | |
|---|---|---|---|---|
| 8,106,557 | B2 * | 1/2012 | Yoshino | H02K 1/276 |
| | | | | 310/156.56 |
| 8,179,011 | B2 * | 5/2012 | Takemoto | H02K 1/2746 |
| | | | | 310/156.53 |
| 9,444,295 | B2 | 9/2016 | Suwazono et al. | |
| 10,411,535 | B2 * | 9/2019 | Takahashi | H02K 1/276 |

(Continued)

FOREIGN PATENT DOCUMENTS

| | | | | |
|---|---|---|---|---|
| EP | 2784909 B1 * | 4/2017 | .......... | H02K 1/2766 |
| JP | 5569542 B2 * | 8/2014 | | |

(Continued)

*Primary Examiner* — Alex W Mok
(74) *Attorney, Agent, or Firm* — Foley & Lardner LLP

(57) ABSTRACT

Each magnetic pole of an embedded magnet rotor includes an iron core in which a magnet is arranged, and has a first flux barrier and a second flux barrier at end portions of the magnet, respectively, across a magnetic pole center. The first flux barrier includes a first extending portion communicating with a first base portion and extending circumferentially from the first base portion toward the magnetic pole center. The second flux barrier includes a second extending portion arranged away from a second base portion with the iron core in between and extending in a circumferential direction from the second base portion side toward the magnetic pole center. Between the second base portion and the second extending portion, a magnetic flux bypass portion connecting an outer periphery and an inner periphery of a rotor in a radial direction by the iron core is formed.

4 Claims, 4 Drawing Sheets

(56) References Cited

U.S. PATENT DOCUMENTS

| | | | | |
|---|---|---|---|---|
| 10,644,550 B2 * | 5/2020 | Takahashi | ............ | H02K 1/2766 |
| 11,456,633 B2 | 9/2022 | Takahashi et al. | | |
| 2009/0026865 A1 * | 1/2009 | Aota | ...................... | H02K 1/276 |
| | | | | 310/156.01 |
| 2012/0242182 A1 * | 9/2012 | Yabe | ...................... | H02K 1/276 |
| | | | | 310/156.53 |
| 2014/0217849 A1 * | 8/2014 | Soma | ................... | H02K 1/2766 |
| | | | | 310/156.53 |
| 2016/0322872 A1 * | 11/2016 | Takahashi | ............ | H02K 1/2766 |
| 2017/0279322 A1 * | 9/2017 | Sasaki | .................... | G01N 27/82 |
| 2019/0097509 A1 * | 3/2019 | Oguchi | ................. | H02K 1/276 |
| 2020/0220398 A1 * | 7/2020 | Takahashi | ............. | H02K 1/276 |
| 2021/0218301 A1 * | 7/2021 | Kitao | ...................... | H02K 1/02 |
| 2022/0014059 A1 | 1/2022 | Nakata et al. | | |

FOREIGN PATENT DOCUMENTS

| | | | | | |
|---|---|---|---|---|---|
| JP | 2014212589 A | * | 11/2014 | ............... | H02K 1/27 |
| JP | 5696820 B2 | | 4/2015 | | |
| JP | 2018011450 A | * | 1/2018 | | |
| JP | 2020-162379 A | | 10/2020 | | |
| KR | 101919697 B1 | * | 11/2018 | ............. | H02K 1/276 |
| WO | WO-2019/064801 A1 | | 4/2019 | | |

* cited by examiner

ROTARY ELECTRIC MACHINE

TECHNICAL FIELD

The present invention relates to an embedded magnet rotor and a rotary electric machine.

BACKGROUND ART

In electric vehicles such as an EV, an HEV, and a PHEV, further reduction in vibration and noise is desired. In order to reduce vibration and noise, it is important to reduce an electromagnetic excitation force of a torque ripple or the like in a rotary electric machine.

For example, Patent Literature 1 proposes a rotor having a flux barrier having a shape extending inward from a magnet end portion toward a magnetic pole center in order to reduce a torque ripple of a rotary electric machine.

CITATION LIST

Patent Literature

Patent Literature 1: JP 5696820 B2

SUMMARY OF INVENTION

Technical Problem

In the rotor having the flux barrier in Patent Literature 1, when a current flows through a coil of a stator, a magnetic flux is less likely to flow on an end portion side in a circumferential direction. Therefore, in the rotor of Patent Literature 1, a magnetic flux flowing through the magnet to an iron core is likely to increase, and demagnetization is likely to occur particularly at a magnet end portion away from the magnetic pole center.

The present invention has been made in view of the above circumstances, and provides an embedded magnet rotor capable of suppressing demagnetization at a magnet end portion away from a magnetic pole center while maintaining a reduction effect of an electromagnetic excitation force.

Solution to Problem

One aspect of the present invention is an embedded magnet rotor in which a plurality of magnetic poles are formed in a circumferential direction of an iron core. Each magnetic pole includes the iron core in which a magnet is arranged, and has a first flux barrier and a second flux barrier at end portions of the magnet, respectively, across a magnetic pole center. The first flux barrier includes a first base portion formed radially outward from a first end portion of the magnet, and a first extending portion communicating with the first base portion and extending circumferentially from the first base portion toward the magnetic pole center. The second flux barrier includes a second base portion formed radially outward from a second end portion of the magnet, and a second extending portion arranged away from the second base portion with the iron core in between and extending in a circumferential direction from the second base portion side toward the magnetic pole center. Between the second base portion and the second extending portion, a magnetic flux bypass portion connecting an outer periphery and an inner periphery of a rotor in a radial direction by the iron core is formed.

A width of the magnetic flux bypass portion may be smaller than a radial width from an outer periphery of the iron core to the second flux barrier.

A rotary electric machine according to another aspect of the present invention includes a stator and the embedded magnet rotor described above.

The rotary electric machine described above may be a motor, and, in each magnetic pole, the second flux barrier and the magnetic flux bypass portion may be arranged on a forward rotation side, and the first flux barrier is arranged on a reverse rotation side.

The rotary electric machine described above may be an electric generator, and, in each magnetic pole, the first flux barrier may be arranged on a forward rotation side, and the second flux barrier and the magnetic flux bypass portion may be arranged on a reverse rotation side.

Advantageous Effects of Invention

According to one aspect of the present invention, it is possible to provide an embedded magnet rotor capable of suppressing demagnetization at a magnet end portion away from a magnetic pole center while maintaining a reduction effect of an electromagnetic excitation force.

DESCRIPTION OF EMBODIMENTS

Figure 1:
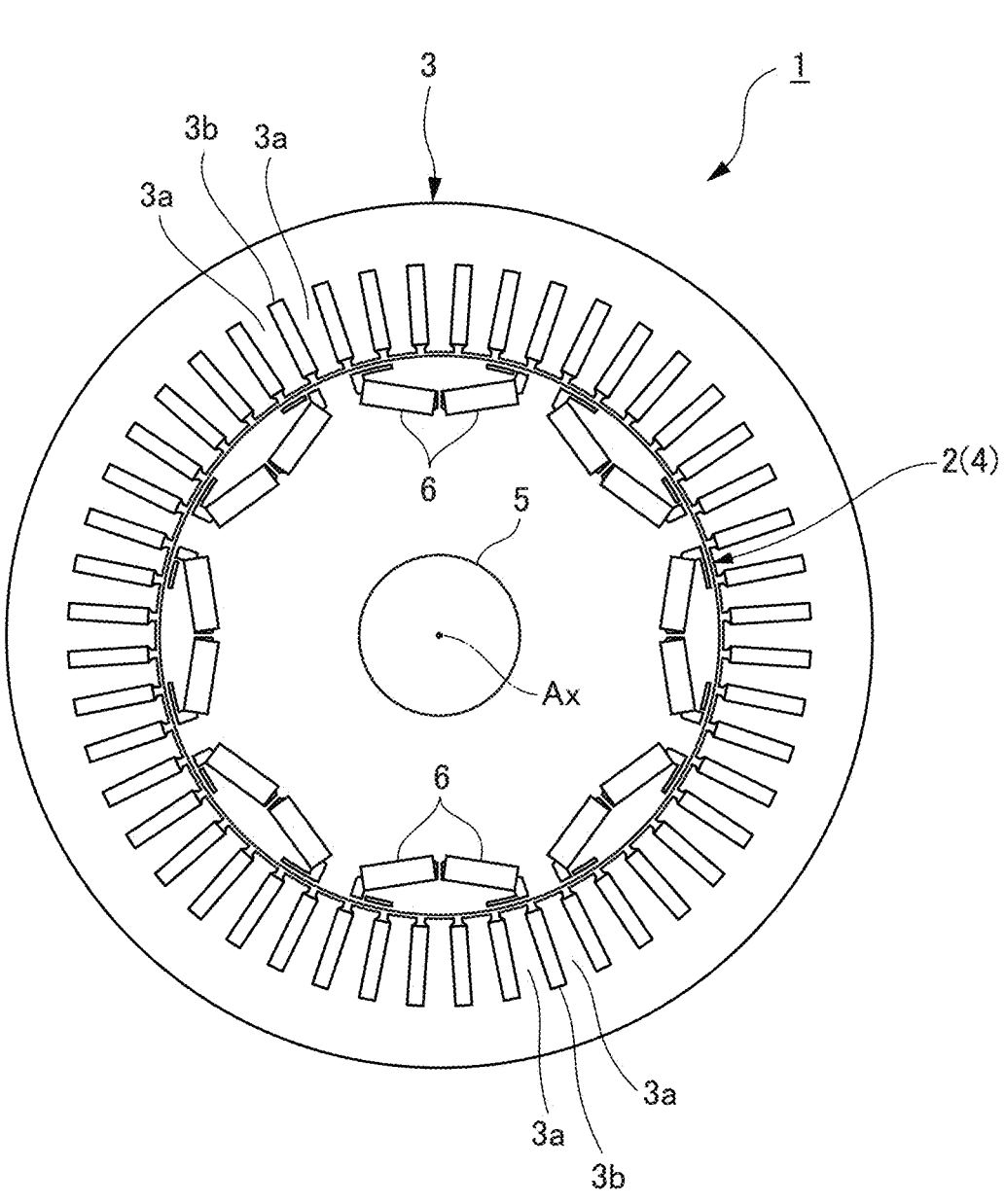
FIG. 1 is a transverse cross-sectional view of a rotary electric machine of the present embodiment.

Hereinafter, an embodiment of the present invention will be described with reference to the drawings.

In the embodiment, for easy understanding, structures and elements other than a main part of the present invention will be described in a simplified or omitted manner. Further, in the drawings, the same elements are denoted by the same reference numerals. Note that, shapes, dimensions, and the like of individual elements illustrated in the drawings are schematically illustrated, and do not indicate actual shapes, dimensions, and the like.

FIG. 1 is a cross-sectional view illustrating a transverse cross section in a direction orthogonal to a rotation axis Ax in a rotary electric machine of the present embodiment. Note that, in the following description, a direction parallel to an extending direction of the rotation axis Ax is referred to as an axial direction, a circumferential direction around the rotation axis Ax is simply referred to as a circumferential direction, and a radial direction around the rotation axis Ax is simply referred to as a radial direction.

A rotary electric machine 1 illustrated in FIG. 1 is an inner rotor type motor, and includes a rotor 2 which is an example of an embedded magnet rotor, and a cylindrical stator 3 arranged on an outer periphery of the rotor 2. In FIG. 1, the extending direction (axial direction) of the rotation axis Ax of the rotary electric machine 1 is a direction perpendicular to the page. Note that, in the rotary electric machine 1 in FIG. 1, a clockwise direction is defined as a forward rotation direction.

The stator 3 is arranged on the outer periphery of the rotor 2 with an air gap in between. In the rotary electric machine 1, by sequentially switching a magnetic field of the stator 3 by current control of a coil 3*b*, the rotor 2 rotates about the rotation axis Ax with an attractive force or a repulsive force with respect to the magnetic field of the rotor 2.

The stator 3 accommodates the rotor 2 in a central space portion around the rotation axis Ax. On an inner peripheral side of the stator 3, a plurality of teeth 3*a* each protruding radially inward toward the rotation axis Ax are provided side by side at equal intervals in the circumferential direction. Between the adjacent teeth 3*a*, slots are individually formed. The coil 3*b* is attached to the slot of the stator 3 along the outer periphery of the rotor 2.

The rotor 2 includes an iron core 4, a shaft 5, and a permanent magnet 6.

The iron core 4 of the rotor 2 is, for example, a cylindrical member formed by stacking punched silicon steel sheets in the axial direction. An insulating adhesive is interposed between the individual silicon steel sheets constituting the iron core 4, and the individual silicon steel sheets are insulated from each other. The shaft 5 is fitted in a shaft center portion of the iron core 4 along the rotation axis Ax. In the rotary electric machine 1, the shaft 5 is rotatably supported by a bearing (not illustrated).

The rotor 2 of the present embodiment is an eight-pole rotor, and the permanent magnets 6 are arranged in a predetermined arrangement in the iron core 4 of the rotor 2 so that eight magnetic poles are formed at equal intervals along the circumferential direction. The permanent magnets 6 are arranged such that magnetic poles adjacent to each other in the circumferential direction in the rotor 2 have polarities opposite to each other.

In the example of FIG. 1, a pair of permanent magnets 6 is arranged per magnetic pole in a tapered pattern in which a distance between the permanent magnets 6 increases toward the outer periphery of the iron core 4. Each permanent magnet 6 has a rectangular cross-sectional shape intersecting with the axial direction, and is magnetized in a direction orthogonal to a long side on a plane orthogonal to the rotation axis Ax. In each permanent magnet 6 in the same magnetic pole, magnetic pole surfaces facing the outer peripheral side are all aligned to the same magnetic polarity (S pole or N pole).

Figure 2:
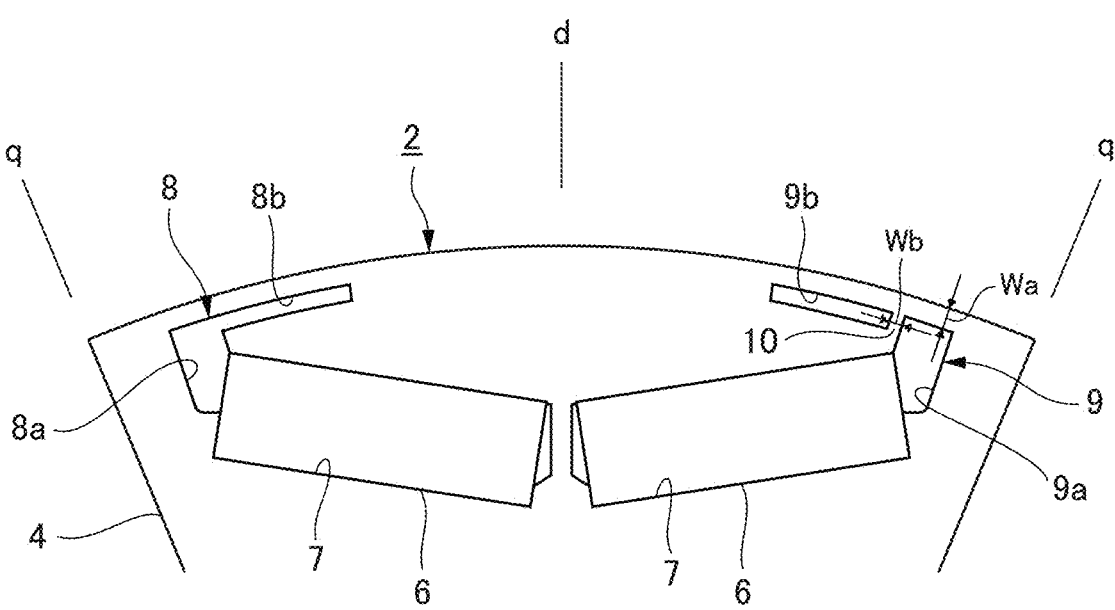
FIG. 2 is a diagram illustrating a rotor for one magnetic pole in the present embodiment.

FIG. 2 is a diagram illustrating the rotor 2 for one magnetic pole in the present embodiment. In one magnetic pole of the rotor 2, an axis connecting an axial center (rotation axis Ax) of the rotor 2 in FIG. 1 and a magnetic pole center for generating magnet torque is a d-axis of d-q axis coordinates. Further, an axis orthogonal to the d-axis in terms of an electrical angle is a q-axis of the d-q axis coordinate. In the rotor 2, a portion between a pair of q axes adjacent to each other serves as an auxiliary magnetic pole portion that generates a reactant torque.

In the iron core 4 of the rotor 2, two magnet holes 7 for fitting magnets are formed to penetrate the iron core 4 in the axial direction. The magnet holes 7 are formed in a tapered pattern in which a distance between the magnet holes 7 increases toward the outer periphery of the iron core 4 so as to be line-symmetric with respect to the magnetic pole center.

On the outer peripheral side from the permanent magnet 6 of the iron core 4, a first flux barrier 8 and a second flux barrier 9 are individually formed. The first flux barrier 8 and the second flux barrier 9 are substantially line-symmetric with respect to the d-axis, and are both formed so as to penetrate the iron core 4 in the axial direction. Further, in a case where the rotary electric machine 1 is a motor, the first flux barrier 8 is arranged on the reverse rotation side (left side in the drawing) with respect to the d-axis, and the second flux barrier 9 is arranged on the forward rotation side (right side in the drawing) with respect to the d-axis.

The first flux barrier 8 has a first base portion 8*a* and a first extending portion 8*b*. The first base portion 8*a* of the first flux barrier 8 communicates with the magnet hole 7 on the reverse rotation side, and extends radially outward from an end portion of the permanent magnet 6. Further, the first extending portion 8*b* of the first flux barrier 8 communicates with the first base portion 8*a*, and extends circumferentially inward from the first base portion 8*a* toward the d-axis side.

The second flux barrier 9 has a second base portion 9*a* and a second extending portion 9*b*. The second base portion 9*a* of the second flux barrier 9 communicates with the magnet hole 7 on the forward rotation side, and extends radially outward from an end portion of the permanent magnet 6. Further, the second extending portion 9*b* of the second flux barrier 9 is formed between the first extending portion 8*b* and the second base portion 9*a* in the circumferential direction, and is separated from the second base portion 9*a* by the iron core (a magnetic flux bypass portion 10 described later).

The second extending portion 9*b* extends inward in the circumferential direction from the second base portion 9*a* side toward the d-axis side, and a distal end of the second extending portion 9*b* faces a distal end of the first extending portion 8*b* across the d-axis. Here, the first extending portion 8*b* and the second extending portion 9*b* are each formed with a width wa in the radial direction from the outer periphery of the rotor 2.

Between the second base portion 9*a* and the second extending portion 9*b*, the magnetic flux bypass portion 10 connecting an outer periphery and an inner periphery of the rotor 2 in the radial direction by the iron core 4 is formed. A width Wb (interval from the second base portion 9*a* to the second extending portion 9*b*) of the magnetic flux bypass portion 10 is preferably formed to be smaller than the radial width Wa of the iron core 4 from the outer periphery of the rotor 2 to the second flux barrier 9 (Wa>Wb).

Each of the first flux barrier 8 and the second flux barrier 9 is a hole (space), has a magnetic permeability extremely smaller than that of the iron core 4, and is less likely to allow a magnetic flux to pass therethrough. Therefore, the first flux barrier 8 and the second flux barrier 9 function as a magnetic blocking portion. Note that, in a case where the hole (space) forming the first flux barrier 8 and the second flux barrier 9 is filled with a nonmagnetic metal having a low magnetic permeability (for example, aluminum, brass, or the like), an adhesive, a varnish, a resin, or the like, each of the holes functions as a magnetic blocking portion.

The first flux barrier 8 and the second flux barrier 9 are formed between the d-axis and the q-axis of the rotor 2, so that harmonic components included in a waveform of a magnetic flux density are suppressed. As a result, distribution of a magnetic flux density generated on the outer peripheral surface of the rotor 2 by the permanent magnet 6 is changed, and in particular, magnetic flux density distribution at both circumferential end portions of the magnetic pole approaches a sine wave. As a result, an electromagnetic excitation force such as a torque ripple in the rotor 2 is effectively reduced.

In the present embodiment, since the magnetic flux bypass portion 10 is formed on the second flux barrier 9 side, demagnetization in the permanent magnet 6 is suppressed. Hereinafter, demagnetization suppression effect in the magnetic flux bypass portion 10 will be described.

Figure 3A:
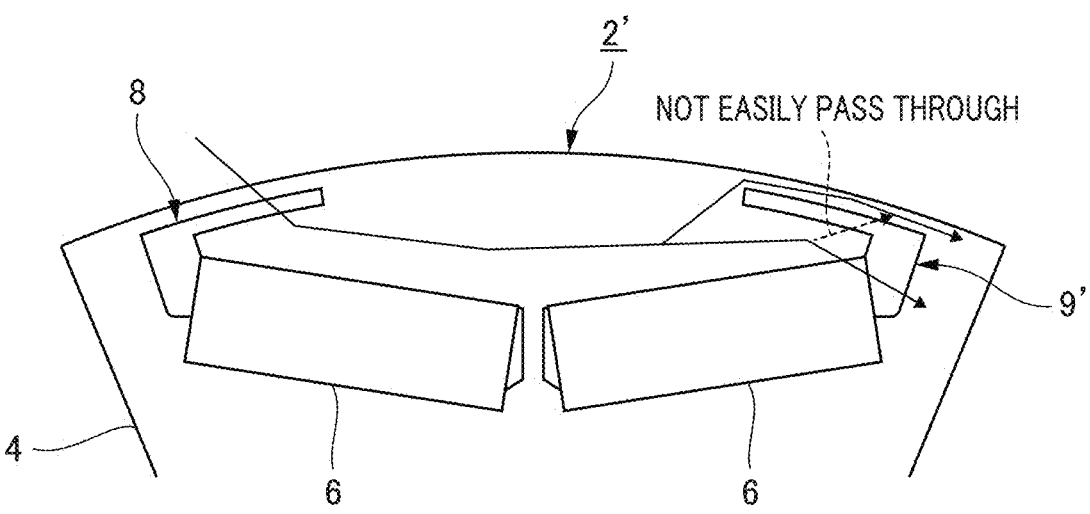
FIGS. 3A and 3B are schematic diagrams illustrating a flow of a magnetic flux in a rotor of a comparative example and a rotor of the present embodiment.
Figure 3B:
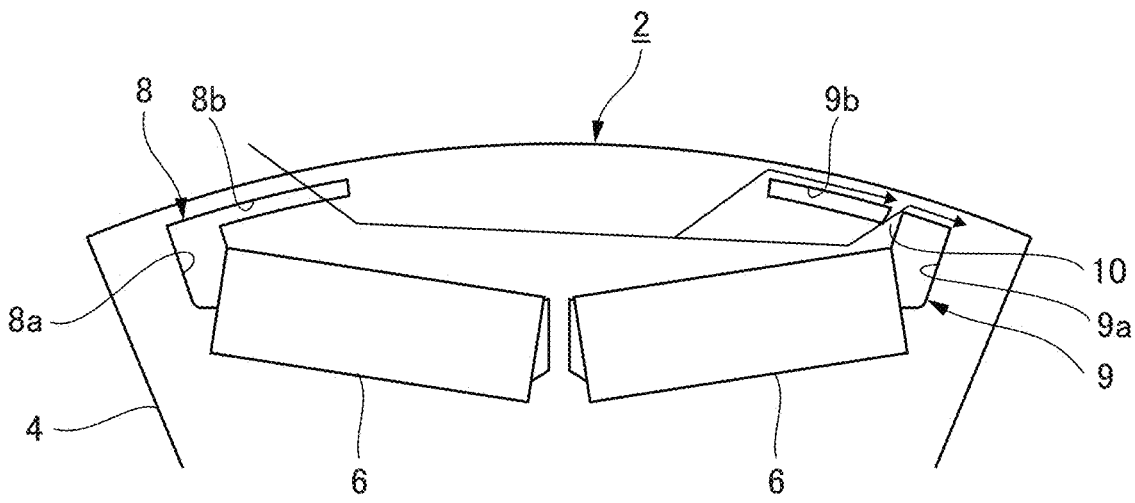

FIG. 3A is a schematic diagram illustrating a flow of magnetic flux in a rotor 2' of a comparative example, and FIG. 3B is a schematic diagram illustrating a flow of a magnetic flux in the rotor 2 of the present embodiment. Note that the comparative example illustrated in FIG. 3A is different from the present embodiment in that the magnetic flux bypass portion 10 is not formed in a second flux barrier 9', and the second base portion 9a and the second extending portion 9b communicate with each other. Note that, in FIGS. 3A and 3B, a flow of a magnetic flux is indicated by an arrow.

In the case of the rotor 2' of the comparative example illustrated in FIG. 3A, a magnetic flux generated in the rotor 2' during forward rotation of the motor is directed from the stator side toward the permanent magnet 6 on the inner peripheral side. Thereafter, a part of the magnetic flux passes through the iron core on the outer peripheral side from the second extending portion 9b, and flows toward an adjacent magnetic pole. However, since the magnetic flux passing through the inner peripheral side from the second extending portion 9b does not easily pass through the second extending portion 9b, the magnetic flux easily flows to the iron core through the permanent magnet 6. As a result, demagnetization in the permanent magnet 6 easily occurs in the comparative example.

Whereas, in the case of the rotor 2 of the present embodiment illustrated in FIG. 3B, a part of a magnetic flux passing through the inner peripheral side from the second extending portion 9b passes through the iron core of the magnetic flux bypass portion 10, and flows from the outer peripheral side of the second base portion 9a toward an adjacent magnetic pole. As a result, in the present embodiment, a part of the magnetic flux passing through the inner peripheral side from the second extending portion 9b is bypassed to the outer peripheral side of the rotor in the vicinity of the end portion of the permanent magnet 6, and the magnetic flux flowing to the iron core through the permanent magnet 6 is reduced as compared with the comparative example. Therefore, demagnetization in the permanent magnet 6 is suppressed.

Note that, in the configuration of the present embodiment, in order to suppress demagnetization of the permanent magnet 6, it is not necessary to take measures such as adopting the permanent magnet 6 having a high coercive force and increasing a thickness of the permanent magnet 6, so that the cost of the permanent magnet 6 can be suppressed.

In the present embodiment, a torque ripple can be effectively suppressed by making the width Wb of the magnetic flux bypass portion 10 smaller than the radial width Wa from the outer periphery of the rotor 2 to the second flux barrier 9.

Figure 4:
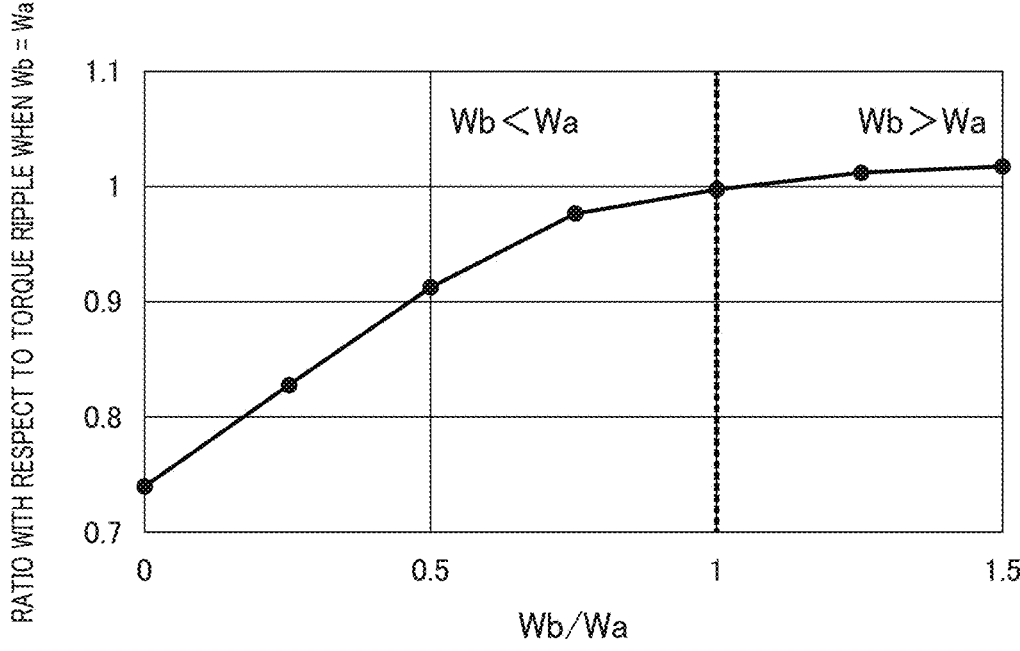
FIG. 4 is a graph illustrating a simulation result of a relationship between a ratio of Wb and Wa and a torque ripple.

FIG. 4 is a graph illustrating a simulation result of a relationship between a ratio of Wb and Wa and a torque ripple. A horizontal axis in FIG. 4 is Wb/Wa, which is 1 when Wb=Wa. A vertical axis in FIG. 4 indicates a size of a torque ripple normalized with a torque ripple when Wb=Wa as 1.

As illustrated in FIG. 4, in a region where Wb is larger than Wa (Wb>Wa), the torque ripple increases as compared with the case of Wb=Wa, and the effect of suppressing the torque ripple by the flux barrier decreases. Whereas, in a region where Wb is smaller than Wa (Wb<Wa), the torque ripple tends to decrease as compared with the case of Wb=Wa. Therefore, by making the width Wb of the magnetic flux bypass portion 10 smaller than Wa, the torque ripple can be more effectively suppressed by the flux barrier.

The present invention is not limited to the embodiment described above, and various improvements and design changes may be made without departing from the gist of the present invention.

In the embodiment described above, the case where the rotary electric machine 1 is a motor has been described, but the embedded magnet rotor of the present invention may be applied to an electric generator. Note that, in a case of applying the embedded magnet rotor of the present invention to an electric generator, the configuration of the forward rotation direction and the reverse rotation direction is reversed, and the first flux barrier is arranged on the forward rotation side while the second flux barrier having the magnetic flux bypass portion is arranged on the reverse rotation side.

In the embodiment described above, the configuration example in which the pair of permanent magnets 6 is arranged in the tapered pattern has been described, but the arrangement of the permanent magnets 6 is not limited to the above. For example, one permanent magnet extending in a direction orthogonal to the d-axis may be arranged for one magnetic pole.

In addition, the embodiment disclosed herein is to be considered in all respects as illustrative and not restrictive. The scope of the present invention is defined not by the description above but by the claims, and it is intended to include all modifications within the meaning and scope equivalent to the claims.

REFERENCE SIGNS LIST

1 rotary electric machine
2 rotor
3 stator
3a teeth
3b coil
4 iron core
5 shaft
6 permanent magnet
7 magnet hole
8 first flux barrier
8a first base portion
8b first extending portion
9 second flux barrier
9a second base portion
9b second extending portion
10 magnetic flux bypass portion

The invention claimed is:
1. A rotary electric machine comprising:
a stator; and
an embedded magnet rotor in which a plurality of magnetic poles are formed in a circumferential direction of an iron core, wherein
the rotary electric machine is a motor,
each of the magnetic poles of the embedded magnet rotor includes the iron core in which a magnet is arranged, and has a first flux barrier and a second flux barrier at end portions of the magnet, respectively, across a magnetic pole center,
the first flux barrier includes: a first base portion formed radially outward from a first end portion of the magnet; and a first extending portion communicating with the first base portion and extending in a circumferential direction from the first base portion toward the magnetic pole center, the second flux barrier includes: a second base portion formed radially outward from a second end portion of the magnet; and a second extending portion arranged away from the second base portion with the iron core in between and extending in a circumferential direction from a side of the second base portion toward the magnetic pole center, between the second base portion and the second extending portion, a magnetic flux bypass portion connecting an outer periphery and an inner periphery of a rotor in a radial direction by the iron core is formed, in each of the magnetic poles, the second flux barrier and the magnetic flux bypass portion are arranged on a forward rotation side while the first flux barrier is arranged on a reverse rotation side, and the second flux barrier has a small opening area in a plane orthogonal to an axial direction as compared to the first flux barrier due to formation of the magnetic flux bypass portion.

2. The rotary electric machine according to claim 1, wherein a width of the magnetic flux bypass portion is smaller than a radial width from an outer periphery of the iron core to the second flux barrier.

3. A rotary electric machine comprising:

a stator; and an embedded magnet rotor in which a plurality of magnetic poles are formed in a circumferential direction of an iron core, wherein the rotary electric machine is an electric generator, each of the magnetic poles of the embedded magnet rotor includes the iron core in which a magnet is arranged, and has a first flux barrier and a second flux barrier at end portions of the magnet, respectively, across a magnetic pole center, the first flux barrier includes: a first base portion formed radially outward from a first end portion of the magnet; and a first extending portion communicating with the first base portion and extending in a circumferential direction from the first base portion toward the magnetic pole center, the second flux barrier includes: a second base portion formed radially outward from a second end portion of the magnet; and a second extending portion arranged away from the second base portion with the iron core in between and extending in a circumferential direction from a side of the second base portion toward the magnetic pole center, between the second base portion and the second extending portion, a magnetic flux bypass portion connecting an outer periphery and an inner periphery of a rotor in a radial direction by the iron core is formed, in each of the magnetic poles, the first flux barrier is arranged on a forward rotation side while the second flux barrier and the magnetic flux bypass portion are arranged on a reverse rotation side, and the second flux barrier has a small opening area in a plane orthogonal to an axial direction as compared to the first flux barrier due to formation of the magnetic flux bypass portion.

4. The rotary electric machine according to claim 3, wherein a width of the magnetic flux bypass portion is smaller than a radial width from an outer periphery of the iron core to the second flux barrier.

* * * * *